United States Patent [19]

Falk

[11] 3,740,529
[45] June 19, 1973

[54] HEATING UNIT

[75] Inventor: Richard B. Falk, Schenectady, N.Y.

[73] Assignee: General Electric Company, Schenectady, N.Y.

[22] Filed: Nov. 1, 1971

[21] Appl. No.: 194,740

[52] U.S. Cl. ................. 219/535, 219/536, 219/549
[51] Int. Cl. ............................................. H05b 3/58
[58] Field of Search ................. 219/535, 528, 536, 219/544, 549; 338/212

[56] References Cited
UNITED STATES PATENTS

| 2,559,077 | 7/1951 | Johnson et al. | 219/528 X |
| 2,710,909 | 6/1955 | Logan et al. | 338/212 |
| 2,741,692 | 4/1956 | Luke | 219/528 |
| 2,938,992 | 5/1960 | Crump | 219/528 |
| 3,218,436 | 11/1965 | Edwards et al. | 219/544 |
| 3,344,385 | 9/1967 | Bartos et al. | 338/212 |
| 3,387,333 | 6/1968 | Irvine et al. | 219/528 X |
| 3,657,517 | 4/1972 | Hoyt | 219/535 |
| 3,281,579 | 10/1966 | Glicksman | 219/535 |
| 3,296,415 | 1/1967 | Eisler | 219/385 |
| 3,446,909 | 5/1969 | Kahn | 219/535 X |

Primary Examiner—Volodymyr Y. Mayewsky
Attorney—Howard I. Schlansker and Arthur V. Puccini

[57] ABSTRACT

An in situ heating unit is provided by embedding an electric heating element in a flexible laminar structure impregnated with partially polymerized high-temperature-resistant resin. The object to be heated is easily and conformably wrapped in the laminate and electric current passed through the heating element to cure the resin, providing a low cost, adherent, void-free, efficient heating unit which is resistant to elevated temperatures and physical abuse.

1 Claim, No Drawings

HEATING UNIT

This invention relates to heating units. More particularly, the invention relates to economical heating units which are easy to fabricate, are adaptable to any shaped structure which is to be heated, and are resistant to elevated temperatures and to physical abuse.

The use of heating units for various shaped structures or vessels in which the heating unit is made conformable to the surface of the structure to be heated is well known. In some cases the heating unit of a heat-resistant fabric such as that of asbestos or other high-temperature-resistant material such as certain polyamides and the like is tailored and shaped to fit the particular surface, heating elements of electrical resistance wire or carbonaceous or other conductive material being used as the heating element proper. It is also well known to prepare such units in the form of, for example, an asbestos tape which has therein an electric heating element, the tape being wound about the structure to be heated in as closely a conformable manner as possible. Such prior art heating units are generally rather expensive, especially where they are tailored to fit a particular shape. They are furthermore relatively short-lived in that the fabric material is subject to tearing and easy deterioration as well as shorting in the case of certain spills such as with water solutions. Despite the care taken in fitting such heating units to a structure, there are inevitably left within the unit and between the unit and the structure voids which detract from the heating efficiency. It is therefore a principal object of the present invention to provide new and useful heating units which are economical, are readily fitted to any particular shaped structure to provide a closely adhering, void-free unit which, when the high-temperature-resistant impregnating resin is cured, is permanent in nature and resistant to elevated temperatures and physical deterioration.

Those features of the invention which are believed to be novel are set forth with particularity in the claims appended hereto. The invention will, however, be better understood and further objects and advantages appreciated from a consideration of the following description.

Briefly, the present invention consists of laminates of heat-resistant material having embedded therein heating elements and impregnated with a partially polymerized high-temperature-resistant resin which is the reaction product of unsaturated bisimide with polyamine. The laminate is readily wrapped in sheet, tape, or other suitable form around a structure to be heated of any desired shape in intimate contact with the surface of the structure to provide good heat transfer, or the heating unit can be entirely constructed on the object to be heated. When in place, an electric current is passed through the heating element or outside heat applied to complete the cure of the resinous impregnant providing on the structure a heating unit which is permanent and efficient.

The resinous materials which are useful in connection with the present invention include those described in U.S. Pat. No. 3,562,223, Feb. 9, 1971, such patent being incorporated herein. Generally, the polymeric materials which are useful are derived from the reaction of unsaturated bisimides and polyamines. The bisimide can be expressed by the formula

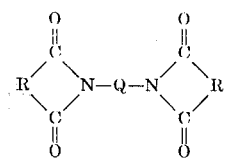

where R is a member selected from the class consisting of the

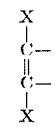

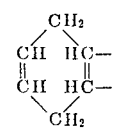

and

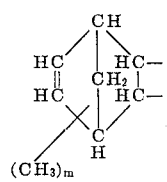

groupings, and halogenated, e.g., chlorinated derivatives of formulas III and IV containing up to six or more halogens, Q is a member selected from the class consisting of divalent organic radicals of at least two carbon atoms (both halogenated and unhalogenated) including but not limited to, e.g., divalent hydrocarbon radicals of up to 40 carbon atoms, and divalent groups consisting of two aryl residues attached to each other through the medium of a member selected from the class consisting of an alkylene radical of from one to 10 carbon atoms —S—, —SO$_2$—,

and —O—, etc., X is a member of the class consisting of hydrogen, halogen, and the methyl radical, and $m$ is 0 or 1, and the methyl group in formula IV can be present in place of any one hydrogen of the mono-hydrogen-substituted carbons.

The polyamine can be expressed by the formula

where Q is described above, it being understood, of course, that the Q in the imide and the polyamine can be different. The bisimides of formula I can vary widely depending upon the types of organic radicals present therein. Among the divalent groupings which Q may broadly and more specifically represent are, for instance, divalent saturated alkylene radicals of up to 40 carbon atoms, for instance, one to 10 (e.g., ethylene, propylene, butylene, isopropylidene, hexylene, cyclohexylene, etc.), the divalent radical of diethylene oxide of the formula —CH$_2$—CH$_2$—O—CH$_2$—CH$_2$—, etc.); arylene (e.g., m-phenylene, p-phenylene, p,p'-biphenylene, dichlorophenylene, biphenylene methylene of the formula

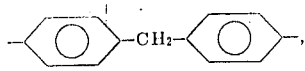

biphenylene oxide, biphenylene sulfone, biphenylene sulfide, keto biphenylene of the formula

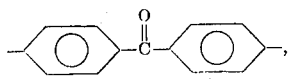

etc.), etc. Obviously, the arylene radicals may be attached to nitrogen through the ortho, meta or para positions.

Typical examples of the bisimides which can be employed with the polyamine compound of formula V are, for instance, N,N'-ethylene-bis-maleimide, N,N'-m-phenylene-bis-maleimide, N,N'-p-phenylene-bis-maleimide, N,N'-hexamethylene-bis-maleimide, N,N'-p,p'-diphenyldimethylsilyl-bis-maleimide, N,N'-p,p'-diphenylmethane-bis-maleimide, N,N'-p,p'-diphenylether-bis-maleimide, N,N'-p,p'-diphenylthioether-bis-maleimide, N,N'-diphenylsulfone-bis-maleimide, N,N'-dicyclohexyl-methane-bis-maleimide, N,N'-m-xylylene-bis-maleimide, N,N'-p,p'-benzophenone-bis-maleimide, N,N'-(3,3'-dichloro-p,p'-biphenylene)bis-maleimide, N,N'-p,p'-diphenyl ether-bis-endomethylene-tetrahydrophthalimide, bis-endomethylene-tetrahydrophthalimide, N,N'-p,p'-diphenylmethane-bis-tetrahydrophthalimide, etc. Halogenated derivatives of such bisimides where halogen is on the anhydride portion of the imide and on an aryl nucleus can also be employed without departing from the scope of the invention, e.g., N,N'-(3,3'-dichloro-4,4'-biphenyloxy)-bis-maleimide, N,N'-(3,3'-dibromo-4,4'-diphenylmethane)-bis-dichloromaleimide, N,N'-4,4'-diphenylmethane-bis-hexachloroendomethylenetetrahydrophthalimide, etc.

Among the specific polyamines which are useful in connection with the present invention, alone or in admixture, are those listed below:

P-xylylene diamine
bis(4-amino-cyclohexyl)methane
hexamethylene diamine
heptamethylene diamine
octamethylene diamine
nonamethylene diamine
decamethylene diamine
3-methyl-heptamethylene diamine
4,4'-dimethylheptamethylene diamine
2,11-diamino-dodecane
1,2-bis-(3-amino-propoxy)ethane
2,2-dimethyl propylene diamine
3-methoxy-hexamethylene diamine
2,5-dimethylhexamethylene diamine
2,5-dimethylheptamethylene diamine
5-methylnonamethylene diamine
1,4-diamino-cyclo-hexane
1,12-diamino-octadecane
2,5-diamino-1,3,4-oxadiazole
H$_2$N(CH$_2$)$_3$O(CH$_2$)$_2$O(CH$_2$)$_3$NH$_2$
H$_2$N(CH$_2$)$_3$S(CH$_2$)$_3$NH$_2$
H$_2$N(CH$_2$)$_3$N(CH$_3$)(CH$_2$)$_3$NH$_2$
meta-phenylene diamine
para-phenylene diamine
4,4'-diamino-diphenyl propane
4,4'-diamino-diphenyl methane
benzidine
4,4'-diamino-diphenyl sulfide
4,4'-diamino-diphenyl sulfone
3,3'-diamino-diphenyl sulfone
4,4'-diamino-diphenyl ether
2,6-diamino-pyridine
bis(4-amino-phenyl)diethyl silane
bis(4-amino-phenyl)diphenyl silane
bis(4-amino-phenyl)phosphine oxide
4,4'-diaminobenzophenone
bis(4-amino-phenyl)-N-methylamine
bis(4-aminobutyl)tetramethyldisiloxane
1,5-diaminonaphthalene
3,3'-dimethyl-4,4'-diamino-biphenyl
3,3'-dimethoxy benzidine
2,4-bis(beta-amino-t-butyl)toluene
toluene diamine
bis(para-beta-amino-t-butyl-phenyl)ether
para-bis(2-methyl-4-amino-pentyl)benzene
para-bis(1,1-dimethyl-5-amino-pentyl)benzene
m-xylylene diamine
polymethylene polyaniline of formula

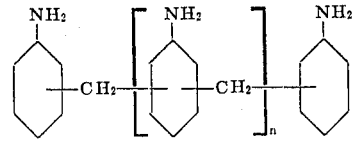

where $n$ is from about 0.1 to 10 and preferably about 0.3.

Useful as the heating element proper of the present invention are any of the usual materials used for embedding or impregnating electrical resistive purposes. Among such materials are the various electrical resistance heating wires, carbon particles, carbon impregnated cloth, conductive glass, conductively coated material, and the like, further examples of which will occur to those skilled in the art.

Useful as the laminate structure material are any of various sheet or fabric or mat materials, preferably fabric such as those of asbestos, high-temperature-resistant polyamide or other fibers, glass and combinations of such materials which can withstand the temperatures involved.

In preparing the present heating unit, the desired number of plies of laminate material are laid up, the layers being interleaved as desired with the heating element proper, whether of wire or other nature. The laid-up structure is then impregnated with the resin described herein and wrapped or fitted around the structure to be heated to conform closely to the surface thereof. Alternatively, the laminae can be impregnated before being laid up or interleaved with the heating element. In some cases the most desirable and convenient form may be that of a sheet, in other cases that of a tape, especially where rather irregular or rounded or shouldered surfaces are to be covered. Combinations of tape and sheet, of course, may be used and where one is mentioned, the other is included. The impregnated laminate with heating element in place is simply wound as desired about the object such as a reaction vessel to be heated, the heating element being connected to a source of electric power to cure the resin resistively and provide a permanently durable vessel and heating unit combination. The resin can also be entirely or partly cured by externally applying heat in any usual manner.

The following example illustrates the practice of the present invention, it being realized that it is not to be taken as limiting in any way.

Example

A resin prepolymer or partially polymerized resin was prepared by placing in a vessel equipped with stirrer, reflux condenser and under nitrogen atmosphere ingredients in the proportion of 164 g of 2-methoxy ethyl acetate which was heated to gentle reflux, there was then added 29.7 g (0.15 mole) of methylene dianiline followed by 134.3 g (0.37 mole) of the bismaleimide of methylene dianiline, the reaction temperature being maintained at gentle reflux for about 4¼ hours. The resultant material was used to impregnate strips of glass cloth laid up in two layers and having therebetween a heating element consisting of nichrome wire. The flexible laminate so prepared was wrapped about a glass structure and electric current passed through the heating element wire to provide a temperature of 350°F which was maintained for 1 hour. In this particular instance, the part was post-cured in a 250°C air circulating oven for about 17 hours although the electrical resistance heating is used as well for this post-curing step. After post-curing the heating unit was tightly adhered to the glass base and presented a continuous, void-free, hard, wear-resistant exterior surface which acted as an efficient source of heat for the unit when connected to an electrical source.

There are provided by this invention efficient heating units for structures to be heated which are readily applied in conformable fashion.

What I claim as new and desire to secure by Letters Patent of the United States is:

1. In combination, a structure to be heated and an electric heating unit conformably wrapped on said structure for heating thereof, said heating unit comprising a laminate having embedded therein electric resistive heating means, said laminate being impregnated with a high-temperature-resistant resinous reaction product of unsaturated bisimide of formula I and polyamine of formula II, curable through said heating means.

* * * * *